(12) United States Patent
Abbott

(10) Patent No.: US 7,953,970 B2
(45) Date of Patent: May 31, 2011

(54) METHOD AND APPARATUS FOR STORAGE OF SECURITY KEYS AND CERTIFICATES

(75) Inventor: Paul Harry Abbott, Kings Somborne (GB)

(73) Assignee: International Business Machines Corporation, Armonk, NY (US)

( * ) Notice: Subject to any disclaimer, the term of this patent is extended or adjusted under 35 U.S.C. 154(b) by 3052 days.

(21) Appl. No.: 10/046,058

(22) Filed: Jan. 10, 2002

(65) Prior Publication Data

US 2002/0129242 A1 Sep. 12, 2002

(30) Foreign Application Priority Data

Mar. 10, 2001 (GB) .................................. 0105984.9

(51) Int. Cl.
*H04L 29/06* (2006.01)

(52) U.S. Cl. ........................................ 713/156; 713/157

(58) Field of Classification Search .................. 380/277, 380/28; 713/167, 200, 156
See application file for complete search history.

(56) References Cited

U.S. PATENT DOCUMENTS

| | | | | |
|---|---|---|---|---|
| 5,001,754 A | * | 3/1991 | Deffeyes | 380/46 |
| 5,010,478 A | * | 4/1991 | Deran | 707/100 |
| 5,319,453 A | * | 6/1994 | Copriviza et al. | 346/6 |
| 5,555,305 A | * | 9/1996 | Robinson et al. | 380/214 |
| 5,592,342 A | * | 1/1997 | Hall et al. | 360/48 |
| 5,706,513 A | * | 1/1998 | Bahls et al. | 707/205 |
| 5,757,922 A | * | 5/1998 | Shiroshita | 380/42 |
| 5,761,710 A | * | 6/1998 | Igami et al. | 711/123 |
| 5,881,287 A | * | 3/1999 | Mast | 717/127 |
| 6,170,058 B1 | * | 1/2001 | Kausik | 713/193 |
| 6,370,250 B1 | * | 4/2002 | Stein | 380/281 |
| 6,418,077 B1 | * | 7/2002 | Naven | 365/233 |
| 6,571,337 B1 | * | 5/2003 | Xiao | 713/194 |
| 6,718,468 B1 | * | 4/2004 | Challener et al. | 713/184 |
| 6,766,024 B1 | * | 7/2004 | Rix | 380/37 |
| 7,003,108 B2 | * | 2/2006 | Henson et al. | 380/44 |
| 2001/0008012 A1 | * | 7/2001 | Kausik | 713/156 |
| 2002/0080975 A1 | * | 6/2002 | Rich et al. | 380/286 |
| 2003/0051026 A1 | * | 3/2003 | Carter et al. | 709/224 |

FOREIGN PATENT DOCUMENTS

| | | | |
|---|---|---|---|
| EP | 0770953 A2 | * | 5/1997 |
| GB | 2318486 A | * | 4/1998 |
| WO | WO0064205 A1 | * | 10/2000 |

OTHER PUBLICATIONS

Hash Collision, Wikipedia.org <URL:http://en.wikipedia.org/wiki/Hash_collision> retrieved online Jun. 1, 2006, p. 1.*
Random (defined), Dictionary.com <URL:http://dictionary.reference.com/search?q=random> retrieved online Jun. 1, 2006, pp. 1-4.*
Leung, C. "Analysis of Secondary Storage Fragmentation", Jan. 1983, IEEE Transactions on Software Engineering, vol. SE-9, No. 1, pp. 87-93.*

* cited by examiner

*Primary Examiner* — Christopher J Brown
(74) *Attorney, Agent, or Firm* — Steven M. Greenberg, Esq.; Carey, Rodriguez, Greenberg & Paul

(57) ABSTRACT

A method and apparatus for storage of security keys and certificates is provided in which the keys and certificates are fragmented into non-uniform lengths and stored in a data file (110). The fragments (152, 154) of the keys and certificates are intermixed within the data file (110). The fragmentation is carried out according to an algorithm (200) which may be based on a pass phrase (140) to the data file (110). The position of storage of each fragment (152, 154) within the data file (110) is also determined by the algorithm (200).

34 Claims, 2 Drawing Sheets

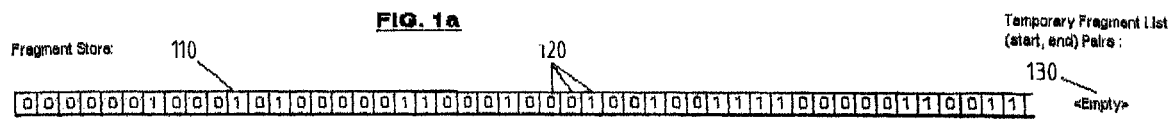
FIG. 1a
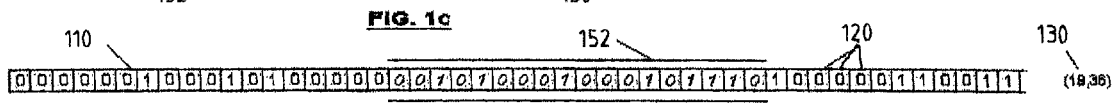
FIG. 1b
FIG. 1c
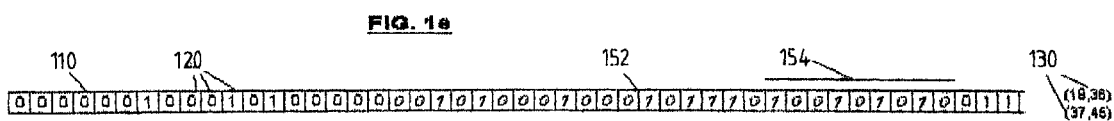
FIG. 1d
FIG. 1e

METHOD AND APPARATUS FOR STORAGE OF SECURITY KEYS AND CERTIFICATES

FIELD OF THE INVENTION

This invention relates to a method and apparatus for storage of security keys and certificates in a data processing system. In particular, the invention relates to storage of private and public encryption keys and their associated certificates and certificate chains.

BACKGROUND OF THE INVENTION

Security of information is a highly important aspect for users of networks, especially users of the Internet. The users may be commercial organisations, governments, universities or private individuals. Networks pass a huge variety of valuable, important and often confidential information. If the information is not secure, the consequences to the user can be disastrous. For example, the results may include financial losses, disclosure of confidential information, loss of confidence from clients and disruption to the user's activities.

When information is passed via a network, it originates at a location of generation of the information and is passed over a communication link to a receiving location. To ensure that the information transfer process is secure, public and private encryption keys are often used. Public and private key pairs ensure that data is authentic and originates from the correct source and that the data has not been modified in transit. Public and private key pair combinations give users the ability to sign and encrypt data in an authenticated, verifiable, and secure fashion.

The private key is held by the originating source and this key is kept secure and is never shared or transmitted via the network. The public key corresponding to the private key is distributed within a digital certificate and is used to confirm the identity of the parties in the transactions and to enable encryption of information for secure delivery to a destination.

A user may deal with many certificates and may have more then one private key that it uses to sign and encrypt or decrypt data.

The originating source signs a message to send to a client using the private key. The client uses the public key, which is extracted from its digital certificate, to verify the signature attached to the message. As the certificate is endorsed by a trusted source and no one else has the same private key, the client has authenticated the source.

Web servers widely use public and private key pairs to ensure that information passed from the server is authentic and is not modified in transit to a Web browser. If an attacker could obtain the private key, they could impersonate the Web server and could also decode previous transactions.

Typically private keys are encrypted and stored on a local file store at the originating source (for example, such as the Web server) and the file store is strongly protected. Since the key is only a few hundred bytes long and the storage space of the file store may be many tens of gigabytes, it has been thought reasonable to presume that the key is hard to find within a file store. However, recent studies have indicated that the keys are, in fact, easier to find than presumed as the keys to the cryptographic systems are unusual numbers with specific mathematical properties that make it possible for an attacker to identify them within the file store.

The threat of key finding is discussed in "Protecting Commercial Secure Web Servers From Key-Finding Threats" by nCipher, Inc. (http://www.ncipher.com/products/rscs/downloads/whitepapers/pcsws.pdf).

The Java platform (Java is a Registered Trade Mark of Sun Microsystems, Inc) has security provisions which include the use of private and public encryption keys. The Java platform enables the dynamic loading of code from a source outside the system. This extremely valuable function raises increased security risks. The use of private and public encryption keys is therefore important to ensure that any code being loaded from a remote source is authentic and has not been tampered with in transit. In this way, the security for the Java platform has the aim of protecting the user's workstation and resources against hostile code.

Since initial commercial deployments of the Java platform were in Web browsers, much of the focus of Java security has been in providing features for protecting against hostile applets; that is against hostile code downloaded from Web sites on the Internet. The Java platform supports security keys and powerful encryption techniques to verify that an applet came from an identifiable source and has not been modified.

An example of Public Key Infrastructure is the Java Cryptography Architecture (JCA) (http://java.sun.com/j2se/1.3/docs/guide/security/CryptoSpec.html) which provides an architecture to manage keys. The architecture is embodied in the java.security package which provides classes and interfaces for access control and authentication. This security architecture allows Java code to create and verify message digests and digital signatures.

In the Java 2 VM the class JavaKeyStore loads and stores cryptographic keys to the local file store in a relatively simple format. The key store is protected by a password, but it has become evident that a private key on a local file store can be identified due to it having a relatively unique binary pattern. Therefore private keys stored in a JavaKeyStore on a machine's file store are exposed. Secondly, once a key store file has been identified, it is easy to extract those bytes which relate to a private key due to the simple and clearly defined structure of the file.

The aim of the present invention is to provide a method and apparatus for protecting in-storage keys.

SUMMARY OF THE INVENTION

According to a first aspect of the present invention there is provided a method for storage of security keys and certificates in a data processing system comprising: providing at least one entity in the form of a key or certificate for storage in a storage means; fragmenting the entity into fragments of non-uniform length according to a predetermined algorithm; storing the fragments in the storage means; wherein fragments of the at least one entity are intermixed within the storage means.

Preferably, the storage means is a data file including a block of data accommodating the entities. The storage means may also contain random bit patterns. Preferably, the step of fragmenting the entity fragments the bytes of the entity.

The location of storing the fragments may also be determined by the algorithm. The entity may also be read from the storage means by using the algorithm to find and recombine the fragments of the entity.

In the event that the storage means has a pass code, the algorithm for fragmenting uses the pass code. The fragments may also be stored at locations in the storage means determined by using the pass code.

The method may include keeping a bit map as a record of fragment locations until the storage is complete. In the event that a fragment has already been stored at a location required for a subsequent fragment, the subsequent fragment is stored immediately after the existing fragment.

In one embodiment, the storage means is a Java keystore repository and the algorithm is implemented as a Java keystore class.

According to a second aspect of the present invention there is provided an apparatus for storage of security keys and certificates in a data processing system comprising: a storage means; at least one entity in the form of a key or certificate for storage in the storage means; wherein the entity is stored in fragments of non-uniform length according to a predetermined algorithm and fragments of the at least one entity are intermixed within the storage means.

According to a third aspect of the present invention there is provided a computer program product stored on a computer readable storage medium, comprising computer readable code means for performing the steps of: providing at least one entity in the form of a key or certificate for storage in a storage means; fragmenting the entity into fragments of non-uniform length according to a predetermined algorithm; storing the fragments in the storage means; wherein fragments of the at least one entity are intermixed within the storage means.

The invention further provides a system, method and computer program for retrieving data that has been stored as described above.

The core of this idea is to fragment the bytes of the keys stored in a file store, making it more difficult to identify which bytes constitute a particular key, thus removing the key's identifying pattern from the file store. This can be achieved by fragmenting a key into a number of variable length pieces which are then scattered throughout the file. The pieces of one key can be intermixed with pieces from other keys. Random bit patterns can also be added to the file to make key identification more difficult. An algorithm is used to fragment a key and to recombine it. The algorithm should only be predictable to those authorised to read the file. A simple way to do this is to use the file store pass-phrase as a basis for the algorithm.

BRIEF DESCRIPTION OF THE DRAWINGS

A preferred embodiment of the invention will now be described in detail by way of example only, with reference to the accompanying drawings in which:

FIGS. 1a to 1e are representations of the storage of security keys and certificates in accordance with the present invention.

DETAILED DESCRIPTION

Figure 2:
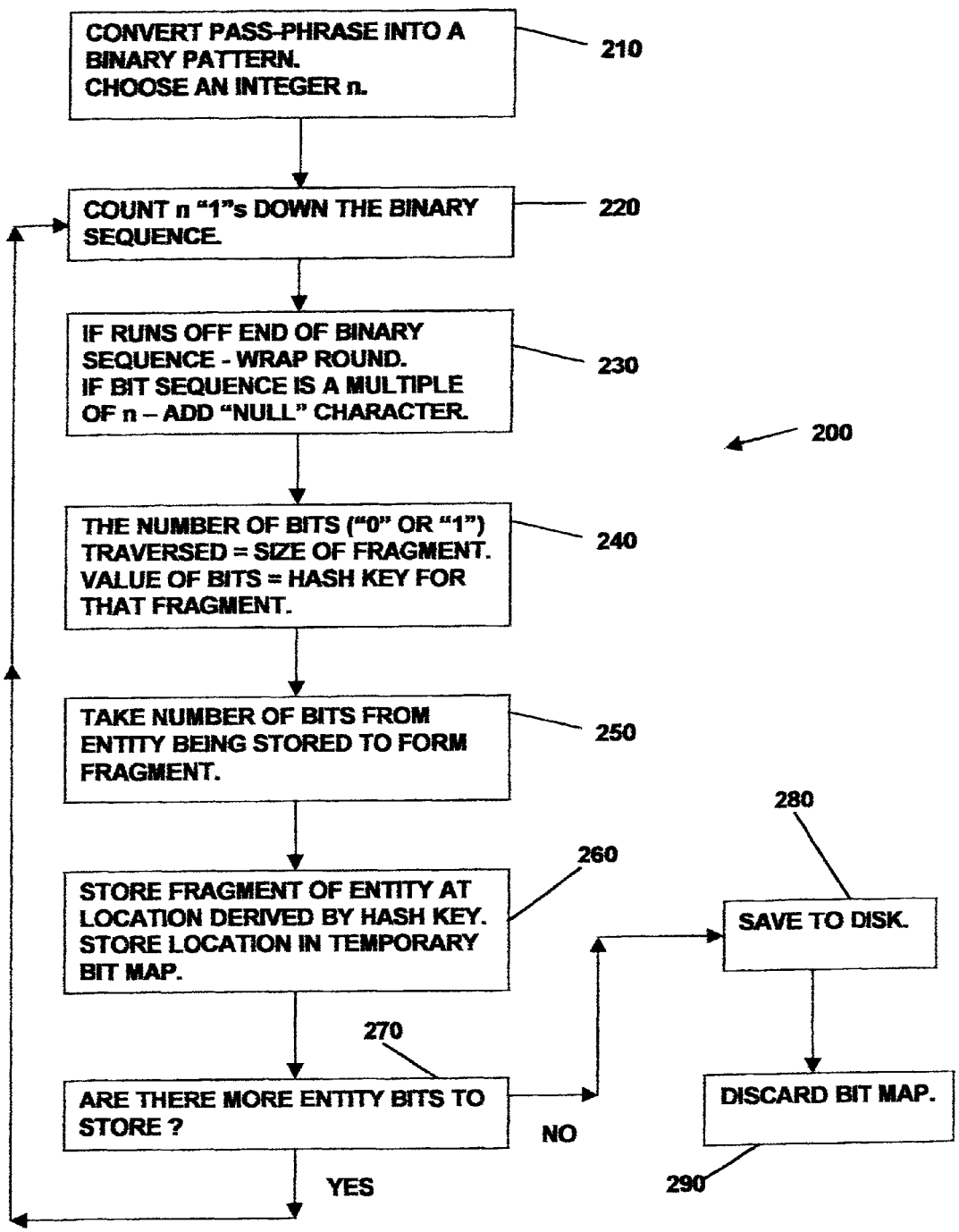
FIG. 2 is a flow diagram of a method for storage in accordance with the present invention.

A key store, providing cryptographic key storage, is a repository of keys and certificates and in the preferred embodiment is an implementation of the Java class KeyStore provided in the java.security package. The KeyStore class loads and stores the cryptographic keys.

Cryptographic key and certificate management is carried out by a utility, keytool. The keytool utility allows developers to administer their own public or private cryptographic key pairs and associated certificates for use in client authentication, or for data integrity and authentication services requiring digital signatures.

The keytool utility manages the key store (repository) of private keys and the associated certificate chains authenticating the corresponding public keys. The key store may be protected with a pass phrase or by a stronger protection mechanism.

There are two basic entries in the key store: key or certificate entries which consist of a private key and a certificate chain; and trusted certificate entries in the form of multiple single certificates with public key entries. A public key entry is represented by a certificate object. A private key entry contains both a password-protected key and an array of certificate objects that represent the certificate chain for the public key that corresponds to the private key. The password encrypts the key data and each private key entry should have a different password.

The keytool utility can create a key store, clone or delete entries in a key store, import certificates (trusted and non-trusted), export certificates, display the contents of the key store, and generate self-signed certificates (including public or private key pairs). Keys and certificates are stored in a key store using a case-insensitive name or alias. The keytool utility uses this alias to refer to a key or certificate.

In accordance with the structure of the security code in a Java platform, the preferred embodiment is implemented as a new key store class, subclassed from KeyStoreSpi, in the same way as JavaKeyStore.

KeyStoreSpi is an abstract class of java.security which defines the service-provider interface for KeyStore. To use the new key store class will involve a user (a person configuring a Java application) altering the entry in the java.secuirty file. The KeyStore class, when invoked, will then pick up the new key store type class.

The existing key store comprises a number of entries
Magic number
Version of this file format
Count
followed by "count" instances of either:
    tag=1
    alias
    timestamp
    crypted private-key info according to PKCS #8
        (integer length followed by encoding)
    cert chain (integer count, then certs; for each cert,
        integer length followed by encoding)
or:
    tag=2
    alias
    timestamp
    cert (integer length followed by encoding)
ended by a keyed SHA1 hash of {password+whitener+
    preceding body}

The new file format starts with the same four fields as the existing JavaKeyStore, allowing identification of the file format. The rest of the file comprises a block of data, adequate to accommodate all entities (private key or certificate instances above) stored in it, plus a small amount of redundant space for random bit patterns. This block of data is referred to as the fragment store.

The first stage of storing an entity in the new file format is to fragment it into x (undefined) variable length fragments. This is achieved by taking the key store pass phrase and bit counting it.

1) Using the pass phrase "A big 1", convert it into a binary pattern using say ASCII encoding for each character.
  binary pattern:
"0101000001 00100000 01100010 01101001 01100111 00100000 00110001"
2) Count n "1"s down the binary sequence, n being some arbitrary value chosen in advance.
3) The number of bits traversed, "0" or "1" determines the size of the fragment (f). The value of the bits is used as a hash key to locate the fragments in the fragment store.

Example 1

If we made n=4

The bit pattern containing 4 "1" is "01000001 00100000 01" and is 18 bits long.

The first fragment would therefore be 18 bits long.

The value 66689 (decimal value of 010000010010000001) would be used as the hash key.

4) Take the required number of bits from the entity being stored (18 in the above example) and store the fragment in a bit location derived from the hash key. A bit map is kept while the fragment store is being filled to record those bits which already hold fragments. The bit map is transient and will be discarded once the complete key store is saved to disc.

5) Once a fragment has been stored, repeat from step 2 counting the next n bits along the binary pattern.

6) When the algorithm runs off the end of the bit sequence we wrap around. If the length of the bit sequence is a multiple of n, an additional "null" character is added to the end of the sequence to prevent a repeating sequence of fragments and locations.

At each iteration, a number of bits are taken from the entity being stored. Once one entity is stored the next entity is stored immediately after it. The loop terminates once there are no more entity bits to store. If the last sequence of bits does not fill a fragment they are padded with random bits. On loading the extra bits can be discarded once the last entity is rebuilt.

Referring to FIG. 1a, a fragment store 110 is provided in an initial state with random bits 120 which contain no fragments of an entity to be stored, for example a key or certificate. A temporary bit map or fragment list 130 is provided which indicates that the fragment store 110 is empty.

A pass phrase (or other key on which the algorithm is based) is converted into a binary pattern 140 as shown in FIG. 1b. A first section 142 of the binary pattern 140 is selected by counting n "1"s down the binary sequence. As in Example 1, n has been chosen to equal 4 and the first section 142 consists of the binary pattern: "010000010010000001".

This first section 142 is the fragment mask and also determines the position hash for the first fragment 152 of the entity to be stored 150. In FIG. 1b, the first section 142 is 18 bits long and therefore the first fragment 152 will be 18 bits long. The position hash for the first fragment 152 is determined by the decimal value of the first section 142; however, for simplicity of illustration in FIG. 1c, the position hash is taken to be "19" (rather than the true decimal value of 66689).

FIG. 1c shows the fragment store 110 with the first fragment 152 of the entity to be stored 150 stored at position "19". As the first fragment 152 is 18 bits long, the temporary fragment list 130 indicates the position of the first fragment 152 as (19,36). For the purposes of illustration, the bits of the first fragment 152 are shown in italics and the random bits 120 in the fragment store 110 are shown in non-italics.

A second section 144 of the pass phrase 140 is then selected by counting a further 4 "1"s and the second section 144 consists of the binary pattern: "100010011" as shown in FIG. 1d. The second section 144 is 9 bits long and so the second fragment 154 of the entity to be stored 150 is 9 bits long.

FIG. 1e illustrates that if the position hash of the second fragment 144 determined by the decimal value of the second section 144 was, for example, "30" it would fall within the position of the first fragment 142 in the fragment store 110 of (19,36). The position hash is then taken to be the end of the existing stored fragment+1. In this illustration, the position hash of the second fragment is 36+1 which equals 37. As the second fragment is 9 bits long the position (37,45) is added to the temporary fragment list 130.

The sequence illustrated in FIGS. 1a to 1e is repeated until all the data of the entity to be stored 150 has been placed in the fragment store 110.

As described above, the location generated from the hashed key value may already contain a key fragment. The bit map or temporary fragment list is used to record which bits of the fragment store are in use. When a new fragment is added and its location clashes with used space, the bits are simply added to the end of the sequence. When the file is read, once again, a bit map or temporary fragment list is created and as bits are read from the fragment store they are marked (in the bit map) as used. If a hashed value points to a used location, the position is moved forward until unused bits are found.

One other situation that may arise (not illustrated in FIG. 1) is that the beginning of the fragment to be stored may fall into free (unoccupied) memory, but its end would extend into an existing stored fragment. In this case the fragment to be stored could be brought forward in memory until its end no longer overlapped the existing fragment. Alternatively, it could in fact be stored at the originally indicated location, but split into two components, the first immediately before the existing fragment, the second immediately after.

Another possibility is that the decimal storage location may lie outside the keystore. This could be handled either by simply wrapping around to derive the desired memory location, or by restricting the choice of n, so that this situation could not arise in the first place.

When creating a key store file for the first time, random bit patterns are added before any data is added; this does not cause a problem for the store/load routines as they use bit maps to identify valid data.

The algorithm 200 for storing the key and certificate entities described above is also illustrated as a flow diagram in FIG. 2. The step of using the pass phrase and converting it into a binary pattern is shown at box 210 together with the step of selecting the arbitrary value n. Counting the n "1"s down the binary sequence is shown at box 220. Box 230 specifies the processes to be carried out if the algorithm runs off the end of the bit sequence or if the length of the bit sequence is a multiple of n. Box 240 shows the determination of the size and location of the fragment. Boxes 250 and 260 show the storing of the fragment. Box 270 determines if there are more entity bits to be stored. If there are more bits the process loops back to box 220. If there are no more entity bits to be stored, the file store is then saved to disk 280 and the temporary bit map can be discarded 290.

It will be appreciated that in order to retrieve the stored key if desired, then essentially the converse process to that described above is performed. This basically means that the flowchart of FIG. 2 is again followed for step 210 through to step 240. Step 250 can then be omitted, and at step 260 the operation performed at the relevant location is to read the fragment rather than write (store). (Note that as previously mentioned the temporary bit map is still created to detect overlap situations which can then be handled accordingly). The process will then loop back, analogous to step 270, if there are further bits to read, until eventually the key is retrieved and the method can exit.

Using the above method of storage, security keys and their certificates are stored within a file as a block of data in which individual components cannot be identified. Even if access to the file was obtained by an unauthorised user, the individual keys and certificates could not be identified by their pattern and read due to the fragmentation.

The pieces of one entity can be intermixed within the storage file with other entities fragmented by the method described above.

The invention is typically implemented as a computer program product, comprising a set of program instructions for controlling a computer. These instructions can supplied preloaded into a system, recorded on a storage medium such as a CD_ROM, or downloaded over a network such as the Internet. It will be appreciated that it finds applicability in a wide range of devices, from mainframe computers, through to workstations, laptops, and potentially many other intelligent devices, such as advanced telephones, set top boxes, and so on, indeed any network-connectable device where security is important.

Improvements and modifications can be made to the foregoing without departing from the scope of the present invention. For example, although in the preferred embodiment the public and private encryption keys are used on a Java platform it will be appreciated that the invention applies equally to other forms and uses of public and private encryption keys.

It will also be appreciated by a person skilled in the art that alternative forms of fragmentation algorithm could be used to the algorithm described herein.

The invention claimed is:

1. A method for storage of security keys and certificates in a data processing system comprising:
providing at least one entity (150) in the form of a key or certificate for storage in a storage means;
fragmenting the entity into fragments (152, 154) of non-uniform length according to a predetermined algorithm (200);
storing the fragments (152, 154) in the storage means (280);
wherein fragments (152, 154) of the at least one entity (150) are intermixed within the storage means.

2. A method for storage as claimed in claim 1, wherein the storage means is a data file including a block of data (110) accommodating the entities (150).

3. A method for storage as claimed in claim 1, wherein the storage means also contains random bit patterns (120).

4. A method for storage as claimed in claim 1, wherein the step of fragmenting the entity (150), fragments the bytes of the entity (150).

5. A method for storage as claimed in claim 1, wherein the location of storing the fragments (152, 154) is also determined by the algorithm (200).

6. A method for storage as claimed in claim 1, wherein the entity (150) can be read from the storage means by using the algorithm (200) to find and recombine the fragments (152, 154) of the entity (150).

7. A method for storage as claimed in claim 1, wherein the storage means has a pass code (140) and the algorithm (200) for fragmenting uses the pass code (140).

8. A method for storage as claimed in claim 7, wherein the fragments (152, 154) are stored at locations in the storage means determined by using the pass code (140).

9. A method for storage as claimed in claim 1, wherein the method includes keeping a bit map (130) as a record of fragment locations until the storage is complete (190).

10. A method for storage as claimed in claim 1, wherein in the event that a fragment (152) has already been stored at a location required for a subsequent fragment (154), the subsequent fragment (154) is stored immediately after the existing fragment (152).

11. A method for storage as claimed in claim 1, wherein the storage means is a keystore repository.

12. A method for storage as claimed in claim 11, wherein the algorithm (200) is implemented as a keystore class.

13. An apparatus for storage of security keys and certificates in a data processing system comprising:
a storage means;
at least one entity (150) in the form of a key or certificate for storage in the storage means;
wherein the entity (150) is stored in fragments (152, 154) of non-uniform length according to a predetermined algorithm (200) and fragments of the at least one entity (150) are intermixed within the storage means.

14. An apparatus for storage as claimed in claim 13, wherein the storage means is a data file including a block of data (110) accommodating the entities (150).

15. An apparatus for storage as claimed in claim 13, wherein the storage means also contains random bit patterns (120).

16. An apparatus for storage as claimed in claim 13, wherein the location of the fragments (152, 154) is also determined by the algorithm (200).

17. An apparatus for storage as claimed in claim 13, wherein the entity (150) can be read from the storage means by using the algorithm (200) to find and recombine the fragments (152, 154) of the entity (150).

18. An apparatus for storage as claimed in claim 13, wherein the storage means has a pass code (140) and the algorithm (200) for fragmenting uses the pass code (140).

19. An apparatus for storage as claimed in claim 18, wherein the fragments (152, 154) are stored at locations in the storage means determined by using the pass code (140).

20. An apparatus for storage as claimed in claim 13, wherein a bit map (130) is kept as a record of fragment locations until the storage is complete (190).

21. An apparatus for storage as claimed in claim 13, wherein the storage means is a keystore repository.

22. An apparatus for storage as claimed in claim 21, wherein the algorithm (200) is implemented as a keystore class.

23. A computer program product for storage of security keys and certificates in a data processing system, said product comprising program instructions in machine-readable form on a medium, said instructions causing the system to perform the steps of:
providing at least one entity (150) in the form of a key or certificate for storage in a storage means;
fragmenting the entity into fragments (152, 154) of non-uniform length according to a predetermined algorithm (200);
storing the fragments (152, 154) in the storage means (280);
wherein fragments (152, 154) of the at least one entity (150) are intermixed within the storage means.

24. A computer program product for storage as claimed in claim 23, wherein the storage means is a data file including a block of data (110) accommodating the entities (150).

25. A computer program product for storage as claimed in claim 23, wherein the storage means also contains random bit patterns (120).

26. A computer program product for storage as claimed in claim 23, wherein the step of fragmenting the entity (150), fragments the bytes of the entity (150).

27. A computer program product for storage as claimed in claim 23, wherein the location of storing the fragments (152, 154) is also determined by the algorithm (200).

28. A computer program product for storage as claimed in claim 23, wherein the entity (150) can be read from the storage means by using the algorithm (200) to find and recombine the fragments (152, 154) of the entity (150).

29. A computer program product for storage as claimed in claim 23, wherein the storage means has a pass code (140) and the algorithm (200) for fragmenting uses the pass code (140).

30. A computer program product for storage as claimed in claim 29, wherein the fragments (152, 154) are stored at locations in the storage means determined by using the pass code (140).

31. A computer program product for storage as claimed in claim 23, wherein the instructions further cause the system to keep a bit map (130) as a record of fragment locations until the storage is complete (190).

32. A computer program product for storage as claimed in claim 23, wherein in the event that a fragment (152) has already been stored at a location required for a subsequent fragment (154), the subsequent fragment (154) is stored immediately after the existing fragment (152).

33. A computer program product for storage as claimed in claim 23, wherein the storage means is a keystore repository.

34. A computer program product for storage as claimed in claim 33, wherein the algorithm (200) is implemented as a keystore class.

* * * * *